United States Patent [19]

Woltman

[11]  4,226,719
[45]  Oct. 7, 1980

[54] TREATING DEVICE FOR LARGE BODIES OF WATER

[76] Inventor: Robert B. Woltman, 44625 Tonapah St., Newberry Springs, Calif. 92365

[21] Appl. No.: 923,463

[22] Filed: Jul. 10, 1978

Related U.S. Application Data

[63] Continuation of Ser. No. 771,882, Feb. 25, 1977, abandoned, which is a continuation-in-part of Ser. No. 694,847, Jun. 10, 1976, abandoned.

[51] Int. Cl.² ............................ C02B 3/08; B01F 3/04
[52] U.S. Cl. .................................. 210/220; 210/758; 261/77; 261/DIG. 75
[58] Field of Search ................... 210/14, 15, 60, 63 R, 210/63 Z, 198 R, 220, 221 R; 239/601; 261/76, 77, DIG. 75

[56] References Cited

U.S. PATENT DOCUMENTS

| 832,737 | 10/1906 | Kaeferle | 261/77 X |
| 1,960,013 | 5/1934 | Jacobsen | 261/77 |
| 2,183,561 | 12/1939 | Hamblin | 261/76 |
| 3,074,697 | 1/1963 | Friedell | 261/76 X |
| 3,295,326 | 1/1967 | White | 261/DIG. 75 |
| 3,365,178 | 1/1968 | Bood | 261/DIG. 75 |
| 3,671,022 | 6/1972 | Laird et al. | 261/DIG. 75 |
| 3,704,008 | 11/1972 | Ziegler | 261/DIG. 75 |

FOREIGN PATENT DOCUMENTS 942754 11/1963 United Kingdom ............ 261/DIG. 75

Primary Examiner—Robert H. Spitzer
Attorney, Agent, or Firm—John H. Crowe

[57] ABSTRACT

A device for simultaneously aerating and chemically treating lakes to prevent or retard the process of eutrophication in the lake waters. The device has a venturi outlet passage for the discharge of a pressurized stream of water and a venturi inlet chamber spaced upstream of the outlet passage, as well as a mixing chamber in which air and treating chemicals can be turbulently ingested into the stream. The device is positioned underwater for use with an open line extending from the mixing chamber to a point above the water surface. A nozzle is attached to the venturi outlet passage. This nozzle has a pair of side openings to draw water into the stream passing through the outlet passage to give the stream greater density and turbulence as it leaves the nozzle. Also, the venturi outlet passage has three communicating chambers with walls shaped to create turbulence in the stream even before it reaches the nozzle. To operate the device, pressurized water is pumped into the venturi inlet chamber to create a partial vacuum in the mixing chamber that sucks air into that chamber through the line connecting it with the atmosphere. A treating chemical such as copper sulfate can be charged into the open upper end of the line for ingestion in the stream of water passing through the device at the same time as air is being sucked through the line.

3 Claims, 5 Drawing Figures

U.S. Patent     Oct. 7, 1980     4,226,719
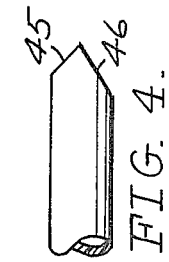
FIG. 5.
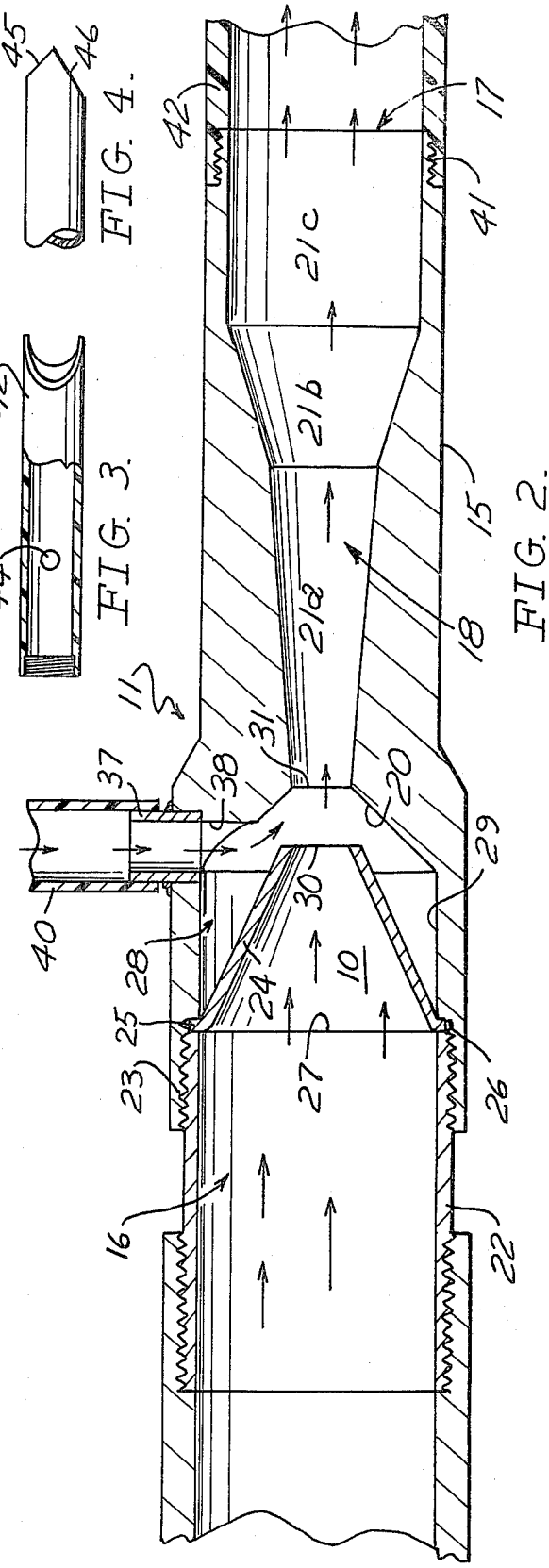
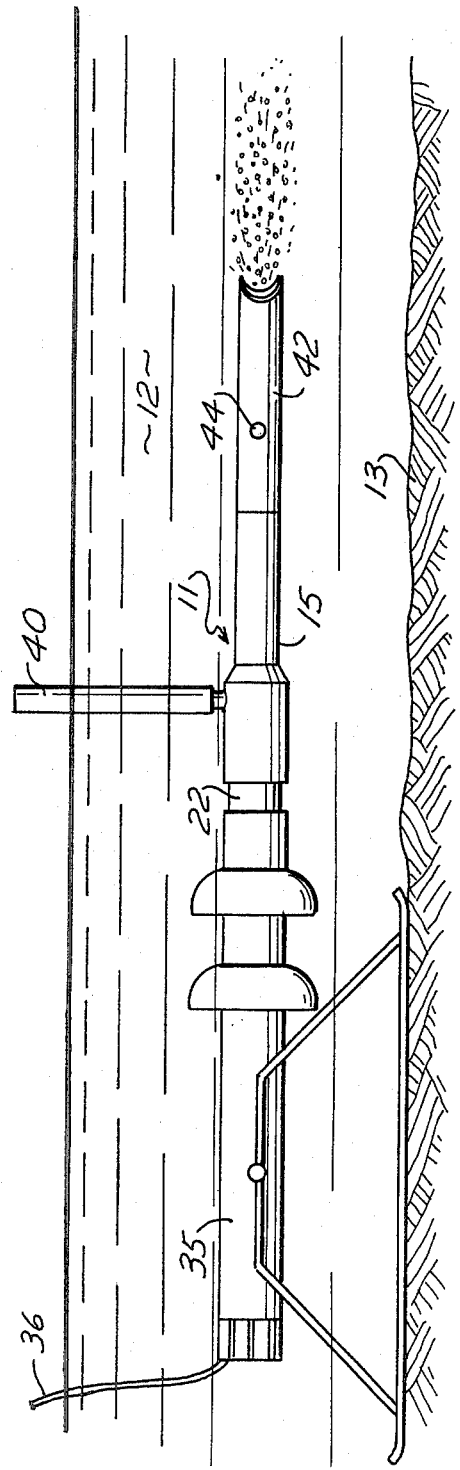

TREATING DEVICE FOR LARGE BODIES OF WATER

CROSS-REFERENCE TO RELATED APPLICATION

This application is a continuation of Ser. No. 711,882, filed Feb. 25, 1977, now abandoned which is a continuation-in-part of my copending U.S. application Ser. No. 694,847, filed June 10, 1976, now abandoned.

BACKGROUND OF THE INVENTION

This invention relates generally to a device for the purifying treatment of a body of water and more particularly to such a device adapted to simultaneously aerate and chemically treat the body of water to prevent or retard eutrophication of the water.

Ponds, lakes and other bodies of water, particularly those in which water is generally quiescent, have a tendency to become eutrophic and thereby support dense growths of algae and undesirable underwater weeds that decay and deplete the water of oxygen. Without agitation, insufficient oxygen can be absorbed from the air by the water to replace that lost through eutrophication so that the water is unable to properly support fish and other aquatic life. The presence of excessive algae and certain types of weeds in lake waters is undesirable for various reasons, including the tendency of the algae to attract insects such as midges and the interference with navigation by thick weed growths.

Heretofore, numerous attempts have been made to aerate the waters of lakes, ponds and the like, but all such attempts of which I am aware have involved the use of shore-installed compressors and many feet of air line to convey compressed air from the compressors into the bodies of water being treated. Such systems have universally failed to do the job properly, primarily due to the fact that they result in the introduction of relatively large air bubbles into the water, which bubbles quickly rise to the surface and pass into the atmosphere. Only minute amounts of oxygen in the bubbles can be absorbed by the water during the quick rise of the bubbles to the surface. Consequently, very little aeration of the water can take place, and this only in the immediate vicinity of the vertically rising bubbles, which means that what little aeration does take place is localized, not uniformly occurent throughout the body of water, particularly where the body is relatively large as in the case of a big lake. Methods heretofore employed for the chemical treatment of bodies of water have generally involved the manual dumping of a treating chemical (typically copper sulfate) from a boat by a crew. Where a two man crew is employed for this purpose, the treatment of a good-sized lake can take several days, and sometimes even weeks.

As those skilled in the art will appreciate, the conventional methods and apparatus heretofore employed for the aeration and chemical treatment of large bodies of water have been time consuming and expensive, and, furthermore, have been largely ineffective in accomplishing the intended purpose with the desired degree of success.

SUMMARY OF THE INVENTION

I have now, by this invention, provided a simple water treating device for immersion in a lake or other body of water that can effectively aerate and simultaneously disperse a chemical treating agent throughout the body of water, and which can be operated by a single man at a central location to accomplish all of this. The device comprises an elongate casing having a venturi outlet passage, a venturi inlet chamber spaced upstream therefrom and a mixing chamber intermediate its ends. The device is designed for underwater installation and can be equipped with an air and chemical intake line venting the mixing chamber to the atmosphere above the surface of the lake. The venturi outlet passage has three consecutive chambers with wall configurations adapted to promote turbulence in a stream of water passing therethrough, and there is preferably a nozzle extension for the venturi outlet passage with side opening means positioned to permit additional water from a surrounding lake, or other, body to be drawn into said stream to create a denser and more turbulent discharge jet from the device.

Preferably, a submersible pump is connected to the inlet end of the device to force high pressure water therethrough and create a suction in the mixing chamber so that air is drawn from the atmosphere through the line communicating that chamber with the open space above the surface of the water. The exit opening of the venturi inlet chamber is preferably positioned midway of the opening admitting air to the mixing chamber, and has the same inside diameter as the inlet opening of the venturi outlet passage. These two venturi openings are spaced apart in axial alignment so that a stream of high pressure water from the submersible pump is aimed directly into the venturi outlet passage from the exit opening of the venturi inlet chamber when the device is in operation. As will thus be apparent, the interconnected pump and water treating device can be positioned entirely underwater, even in shallow water, without any necessity for a shore-installed compressor or the like. When the pump is operating, and atmospheric air is drawn into the mixing chamber through the aforesaid intake line, this air is violently mixed with the stream of water passing through the mixing chamber and into the venturi outlet passage. As a result of this violent mixing action, the air is broken up into tiny, microscopic bubbles and thoroughly mixed into the water stream passing through the device. The distribution of the tiny bubbles in the water stream is maximized in the venturi outlet passage by the violent action of the turbulent water conditions in the three chamber segments of that passage referred to above. The shapes of these three chamber segments will be described in greater detail below.

By the time the air-water mixture reaches the aforesaid nozzle extension, it is moving under great force and turbulence, and the side opening means in the nozzle extension wall referred to above draw in still more water to impart greater density and turbulence to the stream so that it shoots forwardly into the surrounding body of water with penetrating effect as it exits the nozzle. As previously indicated, a chemical treating agent, such as copper sulfate, can be charged into the upper end of the intake line to the mixing chamber if desired, and this is mixed into the stream of water passing through the treating device, and dissolved therein (if it is water soluble), similarly to the way the air is mixed into the stream. The outer end of the extension nozzle preferably has a specially designed configuration, described hereinafter, that imparts a sweeping motion to the aerated stream of water leaving the nozzle.

As previously indicated, the simultaneous aeration and chemical treatment of a large body of water can be accomplished in minimal time by a single man at a single work station by means of my novel treating device, where heretofore the aeration ahd chemical treatment of such a body of water required expensive equipment, separate aeration and chemical treating personnel and separate time consuming procedures, while producing far less effective results than obtainable with my device. In the latter connection, I have experimentally determined that large bodies of water can be uniformly aerated and chemically treated to desired levels of saturation easily and economically with my novel system. Moreover, because of the force and turbulence of the exit stream from my water treating device, I am able, by means of the device, to create sufficient circulation and upwelling in a body of water to prevent stratification of the water into layers of different temperatures. The prevention of such stratification helps to cut down on algae growth in the summer in the upper, warmer, layers of water, and to prevent the formation of ice in the winter when a reverse temperature stratification occur in which the upper layers of water become the coldest.

It is thus a principal object of the present invention to provide means for the simultaneous aeration and chemical treatment of a large body of water by a single man in a single work station, at minimal cost in labor and equipment.

It is another object of the invention to provide such means that draws its feed air directly from the atmosphere and thereby requires no shore-mounted compressor for a supply of such air.

It is still another object of the invention to provide such means of simple construction and manner of operation capable of uniformly distributing oxygen and chemical treating agents throughout large bodies of water in effective proportions to meet recommended ecological standards.

Yet another object of the invention is to provide such means serving additionally to create sufficient circulation and upwelling of the water of lakes and ponds to prevent harmful temperature stratification therein.

Still another object of the invention is to provide such means of extremely simple construction having no moving parts and relatively maintenance free, and relatively inexpensive to manufacture.

Other objects, features and advantages of the invention will become apparent in the light of subsequent disclosures herein.

BRIEF DESCRIPTION OF THE DRAWING

FIG. 1 is a side view of a preferred form of water treating device in accordance with this invention, the device being shown in a position of use in a body of water.

FIG. 2 is a longitudinal sectional view of the device with certain parts being shown broken away.

FIG. 3 is a side view, partly in section, and drawn to a reduced scale, of a discharge nozzle shown fragmentarily in FIG. 2.

FIG. 4 is a fragmentary top view of the discharge nozzle.

FIG. 5 is an end view of the discharge nozzle, as seen from the right of its FIG. 4 position.

DESCRIPTION OF THE PREFERRED EMBODIMENT

Considering now the drawing in greater detail, the water treating device is therein indicated generally at 11. In FIG. 1, the treating device is shown immersed in a position of use in a body of water 12 having a bottom 13.

The device 11 comprises an elongate casing 15 having a water passage extending longitudinally therethrough, said passage including an inlet of round cross-section 16, an outlet of round cross-section 17, and smaller inside diameter than the inlet 16, and a venturi outlet passage indicated generally at 18 intermediate the inlet and outlet. The venturi outlet passage 18 comprises a first frusto-conical chamber 21a, a second frusto-conical chamber 21b, and a cylindrical chamber 21c terminating in the outlet 17. These three chambers are in open communication, and the angle of divergence of chamber 21a is less than that of chamber 21b. Moreover, the middle chamber, 21b, has the shortest axial dimension, and the first chamber 21a the longest axial dimension, of the three chambers. These angular and axial relationships of the chambers are particularly important features of the water treating device, and, as will be seen, result in the creation of sufficient turbulence in a stream of water passing therethrough to thoroughly mix air alone or air and water treating chemicals into the stream.

A short nipple 22 is screw threaded at 23 into the inlet end of the casing 15. A relatively thin-walled frusto-conical member 24 having an outturned annular flange 25 around its larger end is clamped in place between a shoulder 26 on casing 15 and the right end 27 of the nipple 22, in the manner indicated in FIG. 2, to hold it in axial alignment with the venturi outlet passage 18. The frusto-conical member 24 thus forms a venturi inlet chamber 10 aligned with the venturi outlet passage 18. The frusto-conical member 24 extends into a mixing chamber 28 having a first section 29 of cylindrical shape and a second section 20 of frusto-conical shape, and is concentrically spaced from the walls of this mixing chamber in the manner indicated in FIG. 2. The frusto-conical member 24 converges toward an exit opening 30 located within the frusto-conical section 20 of the mixing chamber, which opening (30) has a diameter the same as that of the venturi outlet passage 18 shown at 31 in FIG. 2. This size parity of the openings 30 and 31 is a critically important feature of my invention, for reasons soon to be explained.

The casing 15 is preferably supported near the bottom of a lake or pond to be aerated and/or chemically treated in the manner illustrated in FIG. 1 where it is shown attached to a submersible pump 35 by means of the nipple 22. The submersible pump 35 is an electrically powered pump of known type and commercial availability, the power being supplied through a cable 36 extending to a suitable power source, not shown. Alternatively, the treating device could be installed for use with a shore-mounted water pump through a suitable hose connection, if desired. The submersible pump arrangement is much preferred, however, since this makes it possible to submerge the whole assembly (treating device and pump) in very shallow water (as shallow, for example, as 18 inches) for use, if need be, and cuts down greatly on equipment installation, operation and maintenance costs of the system.

An intake conduit stub 37 is inserted and sealed within a counter-bored opening 38 in the casing 15, which opening extends radially into the mixing chamber 28 through the wall of the frusto-conical section 20 of that chamber. A suction line 40, of either flexible or rigid character, is attached at its lower end to the conduit stub 37 and suitably supported, by means not shown, with its upper end above the surface of the body of water 12. The exit opening 30 of the frusto-conical member 24 is disposed at a point along the axis of casing 15 midway of the counter-bored opening 38, as shown in FIG. 2. I have experimentally determined that this position of the opening 30 of the frusto-conical member 24 midway of the cross-section of the counter-bored opening 38, which is also midway of the cross-section of conduit stub 37, is an important feature of my invention.

The outer end of the casing 15 is screw threaded at 41 to the inner end of a tubular nozzle 42, preferably formed of a suitable plastic material. The nozzle 42 is of the same inner diameter as chamber 21c of the venturi outlet passage 18 of the treating device, and has a pair of diametrically opposed openings 44 formed in its wall. For best results, these openings should be spaced at less than half the distance from the left hand end of nozzle 42 to its right hand end, as seen in FIG. 3, and preferably at a distance equal to approximately one-third the length of the nozzle from the outlet 17 of the casing 15. Such openings should also, for best results, have diameters approximately one-third the inside diameter of the nozzle. It is not necessary that nozzle 42 be threaded directly onto casing 15, and it can be attached thereto by means of a coupling, or in any other suitable manner, if desired.

At its outlet end, as seen to the right in FIG. 3, the nozzle 42 is beveled from the sides to a pointed configuration at its center as seen from the top (FIG. 4). The bevel angles are intentially different, one being more acute than the other, as can be seen in FIG. 4 at 45 and 46. It makes no difference, as will be seen, on which side of the nozzle the more acute angle occurs. This angled end configuration of the nozzle 42 is a very important feature of my invention since, I have discovered, it results in an oscillating, side-to-side sweeping motion in the exit stream from the nozzle during operation of the treating device. This sweeping motion greatly enhances the ability of the treating device to disperse and distribute microscopic air bubbles and dissolved treating chemicals throughout the body of water being serviced by the device. While the nozzle will be somewhat effective for use where it has a blunt, rather than a beveled, discharge end, its effectiveness is greatly enhanced where it has the beveled end configuration.

Operation of the treating device installation of this invention is easily effected by one person in a central location. To place the system in operation, it is only necessary to switch on the power to the submersible pump 35, which then forces water from the body of water 12 into the inlet 16 of the treating device. Because of the converging walls of the frusto-conical member 24, the water reaches a relatively high velocity as it passes through mixing chamber 28 and into the opening 31 of venturi outlet passage 18. This results in a relatively high pressure drop in the mixing chamber 28, so that air is sucked rapidly through the tube 40 and drawn violently into the water stream passing into the opening 31. The water stream issuing from the outlet opening 30 of the frusto-conical member 24 passes as a substantially intact stream into the opening 31 of the venturi outlet passage 18 and it is for this reason that the openings 30 and 31 must be in precise alignment and of the same size. Without such size and alignment parity, some of the water could be trapped in the mixing chamber, and even, perhaps, shoot out through the tube 40, or it would pass in streamline flow through the venturi outlet passage and thus not be subjected to the turbulence necessary to thorough mixing of the air in the water stream that occurs during normal flow of the water through the venturi outlet passage in the below-described manner.

Under normal operating conditions, the stream of water passing through the mixing chamber 28 picks up air entering through the tube 40, and the mixture of water and air enters the opening 31 of the venturi outlet passage, expands some as it passes through chamber 21a and still further as it enters chamber 21b. Because of the angular relationship of the walls of these chambers, and chamber 21c, and the relative lengths of the chambers, as mentioned above and illustrated in the drawing, there are distinct zones near the edges between the chambers where the flow patterns of the passing stream are altered. It is believed that eddy currents are formed in these zones which bring about great turbulence that has a churning effect on the mixture of water and air so that the air is violently distributed throughout the water in the form of microscopic bubbles. Whether or not this violent mixing action can be attributed to the formation of eddy currents, I have nevertheless observed experimentally that the above-described turbulence and mixing action does occur, and that this is responsible for a "homogenizing" of the air and water to the point of maximum dissolved oxygen saturation of the water within the unit so that the air cannot rise to the surface in the form of relatively large bubbles when the stream passes into a body of water, as occurs when compressed air is released underwater. I have experimented with numerous venturi outlet passage configurations, and found that the one generally described and illustrated herein is essential for achievement of the remarkable results of my water treating system.

As the stream of aerated water enters the nozzle 42, it is traveling at great force and churning violently. In passing through the nozzle, its pressure at the openings 44 is still sufficiently low to draw in outside water from the body of water 12, which water increases the density and turbulence of the stream. Finally, as the stream passes out through the beveled end of the nozzle 42, it penetrates deep into the body of water 12 in a laterally sweeping stream. As a result, the aerated water from the nozzle is spread far out into the body of water 12, and the microscopic air bubbles therein remain in the water long enough to reach distant parts of the body and provide uniform aeration thereof. Furthermore, because of the great force and sweeping motion of the stream from the treating device, stratification in the body of water is effectively broken up or prevented.

Where a chemical treating agent, such as copper sulfate, is to be dispersed in the body of water 12 by means of treating device 11, this material is merely fed into the open upper end of the tube 40, after which it is quickly sucked into mixing chamber 28 and ingested rather violently, as in the case of the air, into the water stream passing therethrough. The chemical agent can be added in granulated form, powdered form or liquid form, and the treating device will quickly ingest the material and thoroughly disperse it in the aforesaid water stream. Where the treating chemical is water soluble, much or all of it is in solution, or in extremely finely divided form, by the time it passes out of the nozzle 42 in said stream. The feeding of chemical treating agents in this manner into the treating device wall not interfere with the proper operation of the device, even where the entering material comprises fairly large chunks of solid material. Because of the high vacuum in the mixing chamber 28, and the rapid passage of the water stream therethrough, the only type of solid material that might cause any problem would be that containing pieces of water insoluble material too large to pass through the opening 31 of the venturi outlet passage, which type of material would obviously not be employed for the chemical treatment of a lake or pond.

To illustrate the remarkable effectiveness of the treating device of this invention in aerating and dispersing chemical treating agents in a large body of water, a system such as that described herein was installed and used in Lake Hemet, a large body of water in Southern California about two and a half miles long and half a mile wide. The system was found to function in a highly satisfactory manner, and to aerate Lake Hemet rapidly, inexpensively and with far greater efficiency (in fact, with 85% greater efficiency) than a previously employed compressed air system was able to accomplish. Moreover, test samples taken from all parts of the Lake showed substantially uniform distribution of copper sulfate and oxygen throughout all of its reaches and depths. My system has been able to maintain an oxygen level of 5-6 parts per million in the lower levels of Lake Hemet, as contrasted with a level of 2 parts per million that was the best the previously employed compressed air system was able to maintain. Undesirable weed growth in the Lake was reduced to such an extent, after the dispersion of copper sulfate therein with my system, that waterways previously unnavigable by small boats were thereafter clear for navigation.

While my novel water treating means has been herein described and illustrated in what I consider to be a preferred embodiment, it will be appreciated by those skilled in the art that my invention is not limited to that particular embodiment but is broad enough in concept to encompass all modifications thereof incorporative of the structural and functional essence of the invention as taught herein. In summary, it is emphasized that the present invention includes within its scope all variant forms thereof encompassed by the language of the following claims.

I claim:

1. Treating means particularly adapted for dispersing a treating agent in a body of water comprising:

a casing for immersion in said body, said casing having a water passage therethrough including:

an inlet for connection to a source of pressurized water, an outlet of lesser cross-sectional area than said inlet, inlet venturi passage means intermediate said inlet and said outlet, and outlet venturi passage means downstream of said inlet venturi passage means, said inlet venturi passage means having a restricted outlet opening and said outlet venturi passage means having a restricted inlet opening, the two restricted openings being of round shape and substantially equivalent diameters and being in alignment and axially separated, said casing having structural means forming a watertight mixing chamber including and surrounding the axial space between said restricted outlet opening and said restricted inlet opening and intake opening means into said mixing chamber adapted for communication with the atmosphere above said body of water, said intake opening means defining a passage of round cross-section extending radially into said casing and the restricted outlet opening of said inlet venturi passage means being positioned at a perpendicular plane through the axis of said casing coincident with the extended axis of the intake opening means passage, said outlet venturi passage means comprising a first chamber of frusto-conical shape, a second chamber of frusto-conical shape diverging at a greater angle than said first chamber and a third chamber of cylindrical shape terminating in said outlet, said first chamber being the longest of the three chambers and said second chamber being the shortest of those chambers, said chambers being in communication so that water flowing through said outlet venturi passage means passes through the three chambers in their numbered sequence, whereby the forcing of pressurized water into the inlet end of said casing when the latter is immersed in said body of water for use causes a stream of the water to pass through the restricted outlet opening of the inlet venturi passage means and into the restricted inlet opening of the outlet venturi passage means, then through said outlet venturi passage means in a turbulent condition as a result of the shape of the three chambers making up that passage, and whereby when said water under pressure is being forced through said casing, air from the atmosphere is sucked through said intake opening means, when the latter is in communication with said atmosphere, and ingested into the stream of water passing between said inlet venturi passage means and said outlet venturi passage means in said mixing chamber and mixed violently with the stream in said outlet venturi passage means, and whereby a chemical treating agent can be fed to the mixing chamber through said intake opening means for ingestion into said stream of water in the same manner in which the air is ingested thereinto so that violent mixing of the treating agent and water takes place in said venturi outlet passage means, said treating means including tubular nozzle means connectible to the outlet end of said casing, said nozzle means having an inside diameter equal to that of said third chamber and having opening means through its wall positioned so that a discharge stream from said casing passing through the connected nozzle means draws additional water into said nozzle through said opening means to increase the density and turbulence of said stream and impart greater penetrating force to the stream as it passes through the discharge end of said nozzle means into said body of water, the discharge end of said nozzle means being beveled from opposite sides to the middle to form a pair of points substantially equidistant from the opposite end of the nozzle means, the plane of the beveled configuration on one side being of a more acute angle relative to a plane through the axis of the nozzle means and said pair of points than the plane of the beveled configuration on the other side, whereby a sweeping motion is imparted to the outlet stream from said connected nozzle means when said treating means is in operation.

2. Treating means particularly adapted for dispersing a treating agent in a body of water comprising:

a casing for immersion in said body, said casing having a water passage therethrough including:

an inlet for connection to a source of pressurized water, an outlet of lesser cross-sectional area than said inlet, inlet venturi passage means intermediate said inlet and said outlet, and outlet venturi passage means downstream of said inlet venturi passage means, said inlet venturi passage means having a restricted outlet opening and said outlet venturi passage means having a restricted inlet opening, the two restricted openings being of round shape and substantially equivalent diameters and being in alignment and axially separated, said casing having structural means forming a watertight mixing chamber including and surrounding the axial space between said restricted outlet opening and said restricted inlet opening and intake opening means into said mixing chamber adapted for communication with the atmosphere above said body of water, said intake opening means defining a passage of round cross-section extending radially into said casing and the restricted outlet opening of said inlet venturi passage means being positioned at a perpendicular plane through the axis of said casing coincident with the extended axis of the intake opening means passage, said outlet venturi passage means comprising a first chamber of frusto-conical shape, a second chamber of frusto-conical shape diverging at a greater angle than said first chamber and a third chamber of cylindrical shape terminating in said outlet, said first chamber being the longest of the three chambers and said second chamber being the shortest of those chambers, said chambers being in communication so that water flowing through said outlet venturi passage means passes through the three chambers in their numbered sequence, whereby the forcing of pressurized water into the inlet end of said casing when the latter is immersed in said body of water for use causes a stream of the water to pass through the restricted outlet opening of the inlet venturi passage means and into the restricted inlet opening of the outlet venturi passage means, then through said outlet venturi passage means in a turbulent condition as a result of the shape of the three chambers making up that passage, and whereby when said water under pressure is being forced through said casing, air from the atmosphere is sucked through said intake opening means, when the latter is in communication with said atmosphere, and ingested into the stream of water passing between said inlet venturi passage means and said outlet venturi passage means in said mixing chamber and mixed violently with the stream in said outlet venturi passage means, and whereby a chemical treating agent can be fed to the mixing chamber through said intake opening means for ingestion into said stream of water in the same manner in which the air is ingested thereinto so that violent mixing of the treating agent and water takes place in said venturi outlet passage means, said treating means including tubular nozzle means connectible to the outlet end of said casing, said nozzle means having an inside diameter equal to that of said third chamber and having opening means through its wall positioned so that a discharge stream from said casing passing through the connected nozzle means draws additional water into said nozzle means through said opening means to increase the density and turbulence of said stream and impart greater penetrating force to the stream as it passes through the discharge end of said nozzle means into said body of water, said opening means comprising a pair of diametrically opposed holes in said wall positioned at a distance from said outlet equal to about one-third the length of said nozzle means, the discharge end of said nozzle means being beveled from opposite sides to the middle to form a pair of points substantially equidistant from the opposite end of the nozzle means, the plane of the beveled configuration on one side being of a more acute angle relative to a plane through the axis of the nozzle means and said pair of points than the plane of the beveled configuration on the other side, whereby a sweeping motion is imparted to the outlet stream from said connected nozzle means when said treating means is in operation.

3. Treating means in accordance with claim 2 in which said holes each has a diameter equal to approximately one-third the inside diameter of said nozzle.

* * * * *